United States Patent
Huang et al.

(10) Patent No.: US 11,665,703 B2
(45) Date of Patent: May 30, 2023

(54) PHYSICAL UPLINK CHANNEL TRANSMISSION METHOD AND RECEIVING METHOD, TERMINAL, AND BASE STATION

(71) Applicant: DATANG MOBILE COMMUNICATIONS EQUIPMENT CO., LTD., Beijing (CN)

(72) Inventors: Qiuping Huang, Beijing (CN); Qiubin Gao, Beijing (CN); Runhua Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 193 days.

(21) Appl. No.: 17/057,880

(22) PCT Filed: May 15, 2019

(86) PCT No.: PCT/CN2019/086987
§ 371 (c)(1),
(2) Date: Nov. 23, 2020

(87) PCT Pub. No.: WO2019/223580
PCT Pub. Date: Nov. 28, 2019

(65) Prior Publication Data
US 2021/0204255 A1    Jul. 1, 2021

(30) Foreign Application Priority Data

May 22, 2018    (CN) .......................... 201810497711.2

(51) Int. Cl.
*H04W 72/02*    (2009.01)
*H04W 72/23*    (2023.01)
(Continued)

(52) U.S. Cl.
CPC ........... *H04W 72/23* (2023.01); *H04L 1/1812* (2013.01); *H04W 72/1268* (2013.01); *H04W 72/21* (2023.01)

(58) Field of Classification Search
CPC ........... H04W 72/042; H04W 72/0413; H04W 72/1268; H04W 72/1289; H04W 72/14;
(Continued)

(56) References Cited

U.S. PATENT DOCUMENTS

| | | | |
|---|---|---|---|
| 11,375,527 B1 * | 6/2022 | Eyuboglu | ......... H04W 72/1273 |
| 2015/0156763 A1 * | 6/2015 | Seo | ..................... H04W 72/042 |
| | | | 370/329 |

(Continued)

FOREIGN PATENT DOCUMENTS

| | | |
|---|---|---|
| CN | 102170339 A | 8/2011 |
| CN | 103857041 A | 6/2014 |

(Continued)

OTHER PUBLICATIONS

Extended European Search Report dated Jun. 15, 2021 in European Application No. 19808169.7.
(Continued)

*Primary Examiner* — Lan-Huong Truong
(74) *Attorney, Agent, or Firm* — Harness, Dickey & Pierce, P.L.C.

(57) ABSTRACT

A physical uplink channel transmission method and a physical uplink channel receiving method, a terminal, and a base station are provided. The transmission method includes: receiving, by a terminal, configuration information of a first control channel resource; receiving, by the terminal, DCI according to the configuration information of the first control channel resource; and transmitting, by the terminal, a physical uplink channel corresponding to the DCI by using a first beam corresponding to the DCI.

20 Claims, 7 Drawing Sheets

(51) Int. Cl.
*H04L 1/1812* (2023.01)
*H04W 72/1268* (2023.01)
*H04W 72/21* (2023.01)

(58) Field of Classification Search
CPC ... H04W 72/046; H04W 72/04; H04W 76/19; H04L 1/1812; H04L 5/0051; H04L 5/0053; H04L 5/0055
See application file for complete search history.

(56) References Cited

U.S. PATENT DOCUMENTS

| | | | |
|---|---|---|---|
| 2016/0323029 | A1 | 11/2016 | Cheng et al. |
| 2017/0202009 | A1* | 7/2017 | Kim .................. H04W 72/1284 |
| 2017/0353931 | A1 | 12/2017 | Stern-Berkowitz et al. |
| 2019/0379506 | A1* | 12/2019 | Cheng .................. H04L 1/0026 |
| 2020/0136715 | A1* | 4/2020 | Venugopal ........ H04W 72/0453 |
| 2020/0137588 | A1* | 4/2020 | Zhang .................. H04L 5/0023 |

FOREIGN PATENT DOCUMENTS

| | | |
|---|---|---|
| CN | 105578608 A | 5/2016 |
| CN | 107534888 A | 1/2018 |
| CN | 107567099 A | 1/2018 |
| CN | 104412684 B | 5/2018 |
| CN | 108024344 A | 5/2018 |

OTHER PUBLICATIONS

Nokia et al., "Beam Indication for NR-Push," 3GPP Draft; R1-1802556, 3rd Generation Partnership Project (3GPP), vol. RAN WG1, Feb. 16, 2018.

Ericsson, "Feature lead summary 2 on beam measurement and reporting," 3 GPP Draft; R1-1803346 Feature Lead Summary 2 on Beam Management—offline discussion—RRC, 3GPP, vol. RAN WG1, Mar. 1, 2018.

Mediatek Inc., "Remaining Issues on Beam Management," 3GPP Draft; R1-1806788_BM_V1, vol. RAN WG1 May 20, 2018.

Chinese Office Action dated Apr. 2, 2021 for Chinese Application No. 201810497711.2.

Huawei, Hisilicon, "Summary of remaining issues on beam failure recovery", 3GPP TSG RAN WG1 Meeting #92bis, R1-1803637, Apr. 16-20, 2018, Sanya, China.

Written Opinion and International Search Report dated Nov. 24, 2020 for International Application No. PCT/CN2019/086987.

Taiwanese Office Action dated Jun. 2, 2020 for Application No. TW 108117624.

Chinese Office Action dated Sep. 16, 2021 for Chinese Application No. 201810497711.2.

Huawei, Hisilicon "Beam management for PUCCH", Agenda Item 7.2.2.6, 3GPP TSG RAN WG1 Meeting #91, R1-1719807, Nov. 27-Dec. 1, 2017, Reno, USA.

NTT Docomo, Inc., "PUSCH time-domain resource allocation", Agenda Item 7.1.3.3.1, 3GPP TSG RAN WG1 Meeting #93, R1-1807066, May 21-25, 2018, Busan, Korea.

* cited by examiner

PHYSICAL UPLINK CHANNEL TRANSMISSION METHOD AND RECEIVING METHOD, TERMINAL, AND BASE STATION

CROSS-REFERENCE TO RELATED APPLICATIONS

The present application is a U.S. national phase application of PCT Application No. PCT/CN2019/086987 filed on May 15, 2019, which claims a priority to Chinese Patent Application No. 201810497711.2 filed in China on May 22, 2018, the disclosure of each of which is incorporated in their entirety by reference herein.

TECHNICAL FIELD

The present disclosure relates to the field of mobile communication technology, in particular to a physical uplink channel transmission method and a physical uplink channel receiving method, a terminal, and a base station.

BACKGROUND

A wireless transmitter (for example, a gNB) with a plurality of antennas may form a relatively narrow radio signal pointing at a specific direction (for example, a beam, which may also be referred to as beamforming). The width and direction of a beam may be flexibly adjusted by applying an appropriate weight value to each antenna unit. The beamforming may occur in a digital domain or an analog domain. For digital beamforming, each antenna unit has an individual baseband module. Each antenna unit may independently control the amplitude and phase of a signal transmitted on the antenna unit. Therefore, a digital beam may be a narrow-band beam (for example, the digital beam has a bandwidth narrower than the entire system bandwidth). Different digital beams may be multiplexed in a time domain or a frequency domain. For analog beamforming, a plurality of antenna units share one same digital baseband module. Each antenna unit has an independent phase shifter. A signal transmitted by each antenna unit can only be adjusted in terms of transmission phase shift (the amplitude cannot be adjusted). Therefore, an analog beam is a wide-band beam and can only be multiplexed in a time domain.

The communication between a transmitter and a receiver needs to involve a data signal and a control signal. The control signal is used for indicating to the receiver a manner of decoding the data signal. For example, the control signal, such as downlink control information (DCI) in a 3rd Generation Partnership Project (3GPP) New Radio (NR) system, is transmitted in a physical channel referred to as a physical downlink control channel (PDCCH). Similar to a data channel, a PDCCH may also undergo beamforming to benefit from the space diversity gain produced by a plurality of antennas. A possible PDCCH beamforming method is to make an indication by using a CORESET. A group of time-frequency resource blocks is referred to as one control resource set (CORESET). Each CORESET may correspond to one beam. One PDCCH carrying DCI may be transmitted in one CORESET. The receiver (for example, user equipment (UE)) does not have information related to the precise position of PDCCH transmission. The UE blind-detects the PDCCH in a search space corresponding to a CORESET configured with the search space (each CORESET may correspond to one or more search spaces). If the PDCCH is positively detected, the UE obtains the DCI.

In a 5G system, a base station may configure for UE a group of signal resources used for beam failure detection (a reference signal (RS) resource includes, but is not limited to, a channel state information (CSI)-RS resource, and a synchronization signal (SS)/physical broadcast channel (PBCH) block). This group of signal resources may be referred to as a "beam failure detection signal resource set". Optionally, the base station does not configure a beam failure detection signal resource set for the UE by using signaling, and the beam failure detection signal resource set may be a group of default RSs, for example, an RS quasi co-located with a CORESET used for beam failure detection (the RS includes, but is not limited to, a CSI-RS, and an SS/PBCH block). The quasi co-location (QCL) includes, but is not limited to, QCL in terms of at least one of the following: Doppler shift, Doppler spread, average delay, delay spread, a spatial Rx parameter). It needs to be noted, that two signals are QCL in terms of a property A refers to that it may be assumed the two signals have the same property A.

The UE evaluates the transmission quality of the RS corresponding to the beam failure detection signal resource set, and infers a hypothetical radio link quality (a hypothetical PDCCH block error rate (BLER)) corresponding to the RS. If neither of the hypothetical radio link qualities corresponding to all RSs can satisfy a certain quality requirement, the UE determines that a beam failure occurs. The base station may configure for UE one CORESET or a group of CORESETs used for beam failure recovery (BFR) (for example, in a 5G system, the configuration is performed by using higher layer signaling recoveryControlResourceSetId, and the CORESET used for BFR may be referred to as a BFR-CORESET) and a corresponding search space. After it is detected that all beams fail and a candidate beam that can meet a reliability target is found by the UE, the UE transmits a BFR-request to a gNB to report a new candidate beam. For example, the BFR-request may be transmitted to the gNB and a new candidate beam may be reported by using a random access channel (RACH). The UE monitors a BFR response of the gNB and/or a PDCCH in the BFR-CORESET (the monitoring may be performed by using the reported candidate beam).

How to determine beamforming of a hybrid automatic repeat request (HARQ)-acknowledgment (ACK) transmitted in a physical uplink control channel (PUCCH) after the UE receives a physical downlink shared channel (PDSCH) scheduled by a PDCCH in the BFR-CORESET has not been defined in the related art. If it is not defined, and the beamforming used for transmitting the HARQ-ACK is determined by the UE of its own accord, it may be impossible to transmit the HARQ-ACK using a better transmission beam, so that the base station cannot reliably receive the HARQ-ACK, or a mismatch of uplink transmission and receiving beams may result, so that the reliability of HARQ-ACK is affected.

SUMMARY

The technical problem to be resolved in some embodiments of the present disclosure is to provide a physical uplink channel transmission method and a physical uplink channel receiving method, a terminal, and a base station, to improve the reliability of transmitting a physical uplink channel.

To resolve the foregoing technical problem, the present disclosure provides in some embodiments a physical uplink channel transmission method, including:

receiving, by a terminal, configuration information of a first control channel resource;

receiving, by a terminal, DCI according to the configuration information of the first control channel resource; and transmitting, by the terminal, a physical uplink channel corresponding to the DCI by using a first beam corresponding to the DCI.

The present disclosure further provides in some embodiments a physical uplink channel receiving method, including:

transmitting, by a base station, configuration information of a first control channel resource;

transmitting, by the base station, DCI on the first control channel resource; and receiving, by the base station, a physical uplink channel corresponding to the DCI by using an uplink receiving beam corresponding to a first beam, where the first beam is a beam corresponding to the DCI.

The present disclosure further provides in some embodiments a terminal, including a transceiver, a storage, a processor, and a computer program stored in the storage and configured to be executed by the processor, where the processor is configured to read the computer program stored in the storage to perform the following steps:

receiving configuration information of a first control channel resource by using the transceiver; receiving DCI according to the configuration information of the first control channel resource by using the transceiver; and transmitting a physical uplink channel corresponding to the DCI by using the transceiver by using a first beam corresponding to the DCI.

The present disclosure further provides in some embodiments another terminal, including:

a first receiving unit, configured to receive configuration information of a first control channel resource;

a second receiving unit, configured to receive DCI according to the configuration information of the first control channel resource; and a transmission unit, configured to transmit a physical uplink channel corresponding to the DCI by using a first beam corresponding to the DCI.

The present disclosure further provides in some embodiments a base station, including a transceiver, a storage, a processor, and a computer program stored in the storage and configured to be executed by the processor, where the processor is configured to read the computer program stored in the storage to perform the following steps:

transmitting configuration information of a first control channel resource by using the transceiver; transmitting DCI on the first control channel resource by using the transceiver; and receiving a physical uplink channel corresponding to the DCI by using the transceiver by using an uplink receiving beam corresponding to a first beam, where the first beam is a beam corresponding to the DCI.

The present disclosure further provides in some embodiments another base station, including:

a first transmission unit, configured to transmit configuration information of a first control channel resource;

a second transmission unit, configured to transmit DCI on the first control channel resource; and a receiving unit, configured to receive a physical uplink channel corresponding to the DCI by using an uplink receiving beam corresponding to a first beam, where the first beam is a beam corresponding to the DCI.

The present disclosure further provides in some embodiments a computer-readable storage medium, including instructions, where the instructions are configured to be executed by a computer to implement the foregoing physical uplink channel transmission method or the foregoing physical uplink channel receiving method.

Compared with the related art, by means of the physical uplink channel transmission method, the physical uplink channel receiving method, the terminal, and the base station provided in some embodiments of the present disclosure, the reliability of transmitting a physical uplink channel can be improved.

BRIEF DESCRIPTION OF THE DRAWINGS

To describe the technical solutions of some embodiments of the present disclosure more clearly, the following briefly describes the accompanying drawings required for describing some embodiments of the present disclosure. Apparently, the accompanying drawings in the following description show only some embodiments of the present disclosure, and a person of ordinary skill in the art may still derive other drawings from these accompanying drawings without creative efforts.

DETAILED DESCRIPTION

Figure 1:
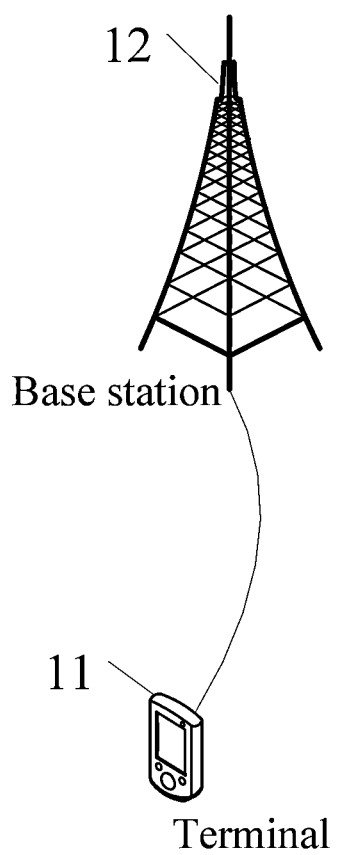
FIG. 1 is a block diagram of a wireless communication system to which some embodiments of the present disclosure are applicable.

The exemplary embodiments of the present disclosure will be more specifically described below with reference to the accompanying drawings. The exemplary embodiments of the present disclosure are shown in the accompanying drawings. However, it should be understood that the present disclosure may be implemented in various forms, and should not be construed as being limited to the embodiments set forth in the present disclosure. Rather, these embodiments are provided so that the present disclosure will be understood more thoroughly, and can fully convey the scope of the present disclosure to a person skilled in the art.

The terms such as "first" and "second" in the description and claims of the present application are only used to distinguish between similar objects, but are not used to describe a specific order or time sequence. It should be understood that the data thus used are interchangeable in appropriate circumstances, so that the embodiments of the present application described herein, for example, can be implemented in other sequences than those illustrated or described herein. In addition, the terms "include", "comprise", and any variation of such terms is intended to cover a non-exclusive inclusion. For example, a process, method, system, product or device that includes a series of steps or units not only includes those steps or units specified expressly, but also includes other steps or units that are not specified expressly or are inherent to the process, method, system, product or device. The term "and/or" in the description and claims represents at least one of associated objects.

The technology described herein is not limited to a Long Term Evolution (LTE) system/an LTE-Advanced (LTE-A) system, and may also be applied to various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" are often used interchangeably. The CDMA system may implement radio technologies such as CDMA2000 and Universal Terrestrial Radio Access (UTRA). The UTRA includes Wideband Code Division Multiple Access (WCDMA) and other CDMA variants. The TDMA system may implement radio technologies such as Global System for Mobile Communications (GSM). The OFDMA system may implement radio technologies such as Ultra Mobile Broadband (UMB), Evolved-UTRA (E-UTRA), IEEE 802.11 (Wi-Fi), IEEE 802.16 (WiMAX), IEEE 802.20, and Flash-OFDM. The UTRA and the E-UTRA are parts of Universal Mobile Telecommunications System (UMTS). The LTE and more advanced LTE (for example, LTE-A) are new UMTS versions using E-UTRA. The UTRA, E-UTRA, UMTS, LTE, LTE-A, and GSM are described in the literature from the 3GPP. The CDMA2000 and UMB are described in the literature from 3GPP2. The technology described herein may be applied to the systems and radio technologies mentioned above, and may also be applied to other systems and radio technologies. However, an NR system is described below for exemplary purpose, and NR terms are used in most of the following description. However, these technologies may also be applied to applications different from the NR system application.

The following description provides examples and does not limit the scope, applicability or configuration set forth in the claims. Changes may be made to the functions and arrangements of the described elements without departing from the spirit and scope of the present disclosure. Various procedures or components may be appropriately omitted, replaced or added in various examples. For example, the described methods may be performed in a sequence different from the described sequence, and various steps may be added, omitted or combined. In addition, features described with reference to some examples may be combined in other examples.

Referring to FIG. 1, FIG. 1 is a block diagram of a wireless communication system to which some embodiments of the present disclosure are applicable. The wireless communication system includes a terminal 11 and a base station 12. The terminal 11 may also be referred to as a user terminal or UE. The terminal 11 may be a terminal side device such as a mobile phone, a tablet personal computer, a laptop computer, a personal digital assistant (PDA), a mobile internet device (MID), a wearable device or an in-vehicle device. It needs to be noted that the type of the terminal 11 is not limited in some embodiments of the present disclosure. The base station 12 may be a base station of 5G or a later version (for example, a gNB, a 5G NR NB or the like) or a base station in another communication system (for example, an eNB, a wireless local area network (WLAN) access point or another access point). The base station may be referred to as a node B, an evolved node B (eNB), an access point, a base transceiver station (BTS), a radio base station, a radio transceiver, a basic service set (BSS), an extended service set (ESS), a NodeB, an evolved NodeB, a home NodeB, a home evolved NodeB, a WLAN access point, a Wi-Fi node or another appropriate term in the art. Provided that the same technical effect is achieved, the base station is not limited to a specific technical term. It needs to be noted that only a base station in an NR system is used as an example in some embodiments of the present disclosure. However, the type of the base station is not limited.

The base station 12 may communicate with the terminal 11 under the control of a base station controller. In various examples, the base station controller may be a part of a core network or some base stations. Some base stations may perform control information or user data communication with a core network by using a backhaul link. In some examples, some of these base stations may directly or indirectly communicate with each other by using a backhaul link. The backhaul link may be a wired or wireless communication link. The wireless communication system may support the operation on a plurality of carriers (waveform signals with different frequencies). A multi-carrier transmitter can send a modulated signal on the plurality of carriers at the same time. For example, each communication link may be a multi-carrier signal modulated according to multiple radio technologies. Each modulated signal may be transmitted on different carriers and may carry control information (for example, a reference signal, and a control channel), overhead information, data, and the like.

The base station 12 may perform wireless communication with the terminal 11 via one or more access point antennas. Each base station may provide communication coverage for a respective corresponding coverage area. The coverage area of the access point may be divided into sectors each constituting a part of the coverage area. The wireless communication system may include different types of base stations (for example, a macro cell, a microcell or a femtocell). The base station may also use different radio technologies such as cellular or WLAN radio access technologies. The base station may be correlated to the same or different access networks or carrier deployments. The coverage areas of different base stations (including coverage areas of the same type or different types of base stations, coverage areas using the same radio technology or different radio technologies, or coverage areas that belong to the same access network or different access networks) may overlap.

The communication link in the wireless communication system may include an uplink (UL) used for carrying uplink transmission (for example, from the terminal 11 to the base station 12) or a downlink (DL) used for carrying downlink transmission (for example, from the base station 12 to the UE 11). Uplink transmission may also be referred to as reverse link transmission, and downlink transmission may also be referred to as forward link transmission. The downlink transmission may be performed by using a licensed band, an unlicensed band or both. Similarly, the uplink transmission may be performed by using a licensed band, an unlicensed band or both.

As described in the Background section, when beamforming of a HARQ-ACK transmitted in a PUCCH after the terminal receives a PDSCH scheduled by a PDCCH in a BFR-CORESET is not defined, if the terminal determines beamforming used for transmitting the HARQ-ACK of its own accord, the reliability of the HARQ-ACK may be affected.

The "beam" mentioned herein may also be described as "beamforming", and may be an analog beam, a digital beam or a digital/analog hybrid beam. This is not limited in some embodiments of the present disclosure.

Figure 2:
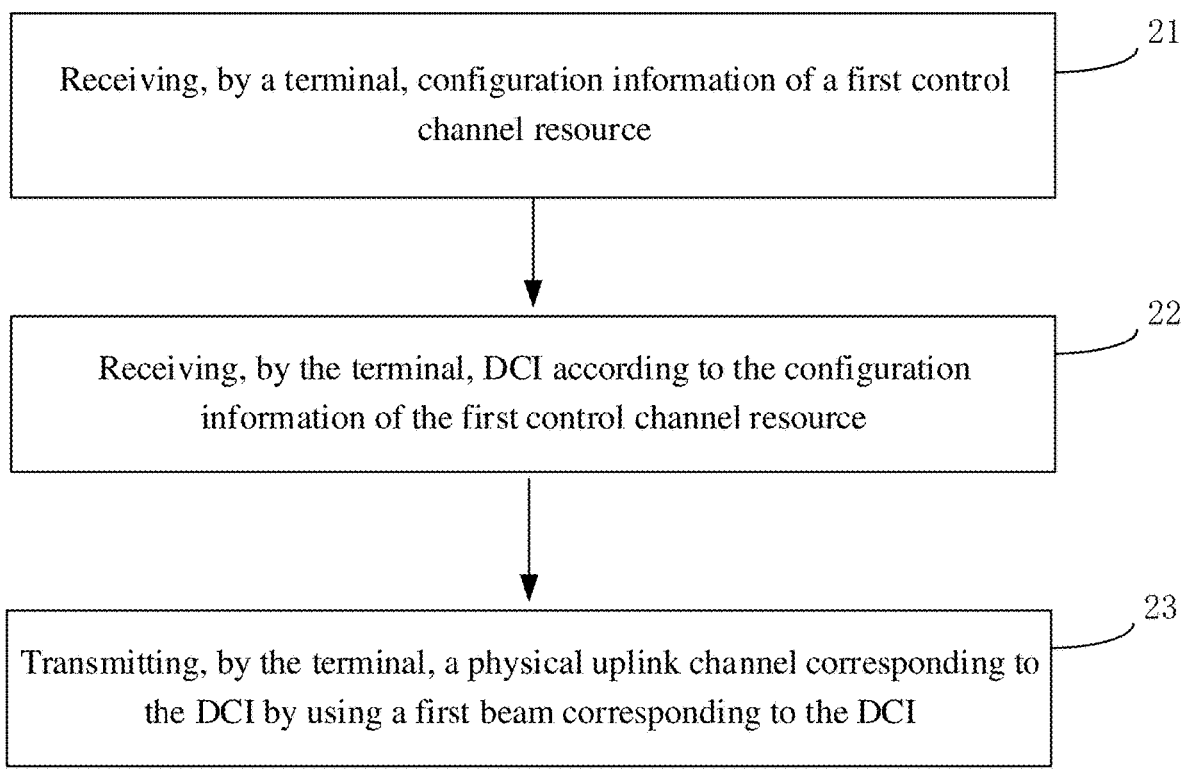
FIG. 2 is a schematic flowchart of a physical uplink channel transmission method according to some embodiments of the present disclosure.

To resolve the foregoing problem, the present disclosure provides in some embodiments a physical uplink channel transmission method, which is applied to a terminal and may improve the reliability of transmitting a physical uplink channel. As shown in FIG. 2, the method includes the following steps.

A step 21 includes: receiving, by a terminal, configuration information of a first control channel resource.

In the step, the first control channel resource may be a BFR-CORESET. In this case, the first control channel resource may include one CORESET or a group of CORESETs. In this case, the configuration information of the first control channel resource may include information such as an identifier of the CORESET, a resource size corresponding to the CORESET, precoding granularity, and QCL information of a PDCCH in the CORESET.

The first control channel resource may also be a search space used for BFR. In this case, the configuration information of the first control channel resource may include information such as a time-frequency resource position of the search space and the corresponding CORESET.

A Step 22 includes: receiving, by the terminal, DCI according to the configuration information of the first control channel resource.

In the step, when the DCI is a downlink scheduling grant, the physical uplink channel is a first PUCCH carrying a HARQ-ACK corresponding to a first PDSCH scheduled by the downlink scheduling grant. That is, the HARQ-ACK corresponding to the first PDSCH is transmitted in the first PUCCH. When the DCI is an uplink scheduling grant, the physical uplink channel is a first physical uplink shared channel (PUSCH) scheduled by the uplink scheduling grant.

Optionally, the terminal may perform blind detection of PDCCH in the search space of the PDCCH according to the configuration information of the first control channel resource, to search for DCI. If DCI is detected, it is considered that the PDCCH carrying the DCI is detected. The terminal may determine the physical uplink channel corresponding to the DCI, and transmit information carried in the physical uplink channel. For example, when the DCI is DCI used for the uplink scheduling grant (for example, a DCI format 0_1 or a DCI format 0_0 in a 3GPP NR protocol), the physical uplink channel corresponding to the DCI is a PUSCH scheduled by the DCI. When the DCI is DCI used for the downlink scheduling grant (for example, a DCI format 1_1 or a DCI format 1_0 in the 3GPP NR protocol), the physical uplink channel corresponding to the DCI may be one or more physical uplink channels for transmitting feedback information on the first PDSCH corresponding to DCI scheduling information, for example, a PUCCH for transmitting HARQ-ACK information of a PDSCH, and for another example, a PUSCH, a PUCCH or the like for transmitting CSI information such as a precoding matrix indicator (PMI) and a reference signal received power (RSRP) of the PDSCH.

A Step 23 includes: transmitting, by the terminal, a physical uplink channel corresponding to the DCI by using a first beam corresponding to the DCI.

In the step, the first beam may be a transmission beam for transmitting a BFR-request by the terminal; or the first beam is a transmission beam corresponding to a receiving beam for receiving the DCI by the terminal; or the first beam is an uplink transmission beam corresponding to a candidate transmission beam reported by the terminal while transmitting a BFR-request; or the first beam is a transmission beam indicated by a base station in advance by using signaling; or the first beam is a predefined default transmission beam.

Optionally, in the foregoing step 23, the terminal may determine whether a signal indicated by first information is of a predetermined type, where the first information is signal indication information included in a configuration parameter that is received by the terminal and used for determining a transmission beam of the physical uplink channel. The terminal may transmit, when the signal indicated by the first information is of the predetermined type, the physical uplink channel by using the first beam; or the terminal may transmit, when the signal indicated by the first information is not of the predetermined type, the physical uplink channel by using a second beam corresponding to the signal indicated by the first information.

The signal indicated by the first information includes, but is not limited to, one or any combination of a CSI-RS, a sounding reference signal (SRS), or an SSB. The predetermined type may be an SRS, a CSI-RS or an SSB.

For example, when the predetermined type is an SRS, if the signal indicated by the first information is an SRS, the terminal may transmit the physical uplink channel corresponding to the DCI by using the first beam corresponding to the DCI. If the signal indicated by the first information is not an SRS, the terminal may transmit the physical uplink channel by using the second beam corresponding to the signal indicated by the first information.

During actual implementation, taking a case that the physical uplink channel is a PUCCH for example, the base station may configure a beam corresponding to a PUCCH by using a CORESET. For example, different PUCCHs may be configured with different corresponding transmission beams. Generally, one configuration of one CORESET corresponds to one beam. The one CORESET corresponds to a search space of one or more PDCCHs and corresponds to the one or more PDCCHs.

Generally, the transmission beam of the PUCCH may be jointly indicated by radio resource control (RRC) signaling and a media access control (MAC)-control element (CE). For example, the base station configures, for the PUCCH by using the RRC signaling, K (K>=1) configuration parameters for determining the transmission beam of the PUCCH (for example, PUCCH-SpatialRelationInfo is used for performing configuration in a 3GPP NR system), and activates, by using the MAC-CE, one of the K configuration parameters for determining the transmission beam of the PUCCH so that the terminal may determine the transmission beam of the PUCCH. When K=1, the MAC-CE may be not required for activating the foregoing parameter, and the terminal may directly determine the transmission beam of the PUCCH according to a parameter configured in the RRC signaling. The configuration parameter for determining the transmission beam of the PUCCH may be a parameter including indication information of a reference signal that is in QCL with a demodulation reference signal (DMRS) port of the PUCCH. The reference signal may be an SSB, a CSI-RS or an SRS. For example, in the 3GPP NR system, the PUCCH-SpatialRelationInfo is a configuration parameter that may be used for determining the transmission beam of the PUCCH, and includes indication information of a reference signal in QCL with a DMRS port of the PUCCH.

By using the foregoing solution, in some embodiments of the present disclosure, a beam used for transmitting a physical uplink channel by a terminal may be defined, so that a base station may use a corresponding receiving beam to receive the physical uplink channel, thereby improving the reliability of transmitting the physical uplink channel.

To help to understand the foregoing solution, a plurality of application scenarios are described below with reference to the steps in FIG. 2.

Application Scenario 1:

In the step 21, the terminal receives the configuration information of a first control channel resource. In the application scenario 1, the first control channel resource is a BFR-CORESET.

In the step 22, the terminal may obtain, according to the configuration information of the first control channel resource, the search space of the PDCCH transmitted on the control channel resource and the corresponding QCL information. The terminal performs blind detection of the PDCCH in the search space. If the terminal detects the DCI used for the uplink scheduling grant (that is, detects the PDCCH for transmitting the DCI), the terminal decodes the DCI to obtain information such as a transmission resource position, a quantity of transmission streams, precoding, and an antenna port of a PUSCH corresponding to the DCI.

In the step 23, assuming that an uplink transmission beam corresponding to the DCI transmitted in the BFR-CORESET is the transmission beam for transmitting the BFR-request by the terminal, the terminal may transmit the physical uplink channel by using the beam corresponding to the DCI. Specifically, the terminal may transmit the PUSCH by using the transmission beam used for transmitting the BFR-request by the terminal.

In the embodiment, when the first control channel resource is a BFR-CORESET and the DCI is DCI that is transmitted by using the first control channel resource and is used for the uplink scheduling grant, the terminal may transmit the PUSCH by using the transmission beam used for transmitting the BFR-request by the terminal.

Application Scenario 2:

In the step 21, the terminal receives the configuration information of the first control channel resource. In the application scenario 2, the first control channel resource is a BFR-CORESET.

In the step 22, the terminal receives the DCI according to the configuration information of the first control channel resource, where the DCI is DCI that is transmitted by using the first control channel resource and used for the downlink scheduling grant.

In the step 23, the physical uplink channel corresponds to the PUCCH carrying the HARQ-ACK information of the PDSCH scheduled by the DCI of the downlink scheduling grant. An uplink transmission beam corresponding to the DCI transmitted in the first control channel resource is the transmission beam for transmitting the BFR-request by the terminal. The terminal may use the transmission beam used for transmitting the BFR-request by the terminal to transmit the PUCCH carrying the HARQ-ACK information of the PDSCH scheduled by the DCI of the downlink scheduling grant.

Application Scenario 3:

In the step 21, the terminal receives the configuration information of the first control channel resource. In the application scenario 3, the first control channel resource is a BFR-CORESET.

In the step 22, the DCI is DCI that is transmitted by using the first control channel resource and used for the downlink scheduling grant.

In the step 23, the physical uplink channel corresponds to the PUCCH carrying the HARQ-ACK information of the PDSCH scheduled by the DCI of the downlink scheduling grant. The uplink transmission beam corresponding to the DCI transmitted in the first control channel resource is the transmission beam for transmitting the BFR-request by the terminal. The terminal may use the transmission beam used for transmitting the BFR-request by the terminal to transmit the PUCCH carrying the HARQ-ACK information of the PDSCH scheduled by the DCI of the downlink scheduling grant. For a PUCCH carrying the HARQ-ACK information of the PDSCH scheduled by the DCI that is transmitted in another CORESET and used for the downlink scheduling grant, the terminal may transmit the PUCCH by using the transmission beam configured by the base station for the PUCCH.

An embodiment in which the physical uplink channel corresponds to the transmission of a PUCCH is described below. It should be understood that the methods in the following embodiments are also applicable to a case in which the physical uplink channel is a PUSCH.

After the terminal receives the first PDSCH scheduled by the PDCCH in the BFR-CORESET, the transmission beam for transmitting the BFR-request by the terminal may be used to transmit the first PUCCH carrying the HARQ-ACK corresponding to the first PDSCH.

It needs to be noted that there may be a plurality of PDCCHs in the BFR-CORESET. These PDCCHs may schedule a plurality of PDSCHs. This is not limited in some embodiments of the present disclosure.

It needs to be noted that, the first PUCCH may be a PUCCH that only carries the HARQ-ACK corresponding to the first PDSCH and does not carry the HARQ-ACK corresponding to other PDSCH than the first PDSCH, or may be a PUCCH that carries the HARQ-ACK corresponding to the first PDSCH and the HARQ-ACK corresponding to other PDSCH than the first PDSCH. This is not limited in some embodiments of the present disclosure.

Optionally, the terminal may transmit a second PUCCH according to the transmission beam indicated by the base station for the second PUCCH, where the second PUCCH is other PUCCH than the first PUCCH, or the second PUCCH is a PUCCH that is different from the first PUCCH and carries the HARQ-ACK corresponding to other PDSCH than the first PDSCH.

In some embodiments of the present disclosure, a manner in which the base station indicates transmission beam for a PUCCH, such as a manner in which the base station indicates transmission beam for the second PUCCH or indicates transmission beam for the first PUCCH may include: indicating, by the base station for a PUCCH by using signaling, a configuration parameter for determining the transmission beam of the PUCCH. For example, the base station configures, for the PUCCH by using the RRC signaling, K (K>1) parameters for determining the transmission beam of the PUCCH, and activates, by using the MAC-CE, one of the K configuration parameters for determining the transmission beam of the PUCCH so as to determine the transmission beam of the PUCCH. Optionally, the base station configures, for the PUCCH in the BFR-CORESET by using the RRC signaling, one parameter for determining the transmission beam of the PUCCH. In 3GPP NR, the parameter used for determining the transmission beam of the PUCCH is represented by the parameter PUCCHSpatialRelationInfo.

The information of the configuration parameter for determining the transmission beam of the PUCCH may be directly indicated by a beam sequence number or may be indirectly indicated by other reference signal. For example, the information is indicated by a signal in spatial QCL with a DMRS port of the PUCCH.

The configuration parameter for determining the transmission beam of the PUCCH may include indication information used for determining an SSB, a CSI-RS or an SRS of the transmission beam of the PUCCH. The terminal may determine, according to MAC-CE signaling used for activating the configuration parameter for determining the transmission beam of the PUCCH, the transmission beam of the PUCCH indicated by the base station, or the terminal determines, according to the RRC signaling used for configuring the configuration parameter for determining the transmission beam of the PUCCH, the transmission beam of the PUCCH indicated by the base station (when K=1). When the base station configures, by using the RRC signaling, for one PUCCH a plurality of parameters used for determining the transmission beam of the PUCCH, but the parameters are not activated by using MAC-CE, the terminal may transmit the PUCCH by using a default transmission beam. For example, the PUCCH is transmitted by using the transmission beam for transmitting an initial access RACH, or, the PUCCH is transmitted by using a transmission beam of msg3 for a random access procedure.

In an optional manner, when the signal indication information included in the configuration parameter that is indicated by the base station by using signaling and is used for determining the transmission beam of the PUCCH is of a predetermined type, the terminal may use the foregoing first beam to transmit the PUCCH carrying the HARQ-ACK corresponding to the PDSCH scheduled by the PDCCH in the BFR-CORESET. If the signal indicated by the signal indication information is not of the predetermined type, the terminal may transmit, by using the transmission beam corresponding to the signal indication information included in the configuration parameter that is indicated by the base station and is used for determining the transmission beam of the PUCCH, the PUCCH carrying the HARQ-ACK corresponding to the PDSCH scheduled by the PDCCH in the BFR-CORESET.

In an optional manner, when the predetermined type is an SRS, if the signal indicated by the signal indication information included in the configuration parameter that is indicated by the base station by using signaling and is used for determining the transmission beam of the PUCCH is an SRS, the terminal may use the foregoing first beam to transmit the PUCCH carrying the HARQ-ACK corresponding to the PDSCH scheduled by the PDCCH in the BFR-CORESET. If the signal indicated by the signal indication information is not an SRS, the terminal may transmit, by using the transmission beam (the foregoing second beam) corresponding to the signal indication information included in the configuration parameter that is indicated by the base station and is used for determining the transmission beam of the PUCCH, the PUCCH carrying the HARQ-ACK corresponding to the PDSCH scheduled by the PDCCH in the BFR-CORESET. Certainly, in some embodiments of the present disclosure, when the signal indicated by the signal indication information is an SRS, the transmission beam (the foregoing second beam) corresponding to the signal indication information included in the configuration parameter that is indicated by the base station and is used for determining the transmission beam of the PUCCH may be used to transmit the PUCCH carrying the HARQ-ACK corresponding to the PDSCH scheduled by the PDCCH in the BFR-CORESET; and when the signal indicated by the signal indication information is not an SRS, the first beam is used for transmitting the PUCCH carrying the HARQ-ACK corresponding to the PDSCH scheduled by the PDCCH in the BFR-CORESET. Optionally, when the signal indicated by the signal indication information is an SRS, the transmission beam corresponding to the signal indication information is the transmission beam corresponding to the SRS.

Similarly, in a case that the predetermined type is an SSB or a CSI-RS, the terminal may also perform processing in the foregoing manner. For brevity, details are not described again.

In addition, it needs to be noted that, in an implementation, the terminal may pre-store a beam pair for downlink reception and uplink transmission, so that the terminal may determine, according to a downlink receiving beam of a CSI-RS or SSB, an uplink transmission beam corresponding to the downlink receiving beam.

In another preferred manner, in the foregoing step 23, the terminal may ignore the configuration parameter that is indicated by the base station and is used for determining the transmission beam of the PUCCH, and directly use the first beam to transmit the physical uplink channel corresponding to the DCI. In this case, regardless of whether the base station uses signaling to indicate the parameter used for determining the transmission beam of the PUCCH or regardless of the information of the parameter that is indicated by the base station and is used for determining the transmission beam of the PUCCH, after receiving the PDSCH scheduled by the PDCCH in the BFR-CORESET, the terminal may use the beam for transmitting the BFR-request by the terminal to transmit the PUCCH carrying the HARQ-ACK corresponding to the PDSCH scheduled by the PDCCH in the BFR-CORESET.

Optionally, the BFR-request may be transmitted by using an RACH. An RACH resource used for BFR may be a contention-free RACH (CFRA) resource or a contention RACH (CRA) resource.

Optionally, the transmission beam of the BFR-request may be selected by the terminal based on a beam measurement. The base station configures a plurality of candidate beams. The terminal measures these candidate beams, and selects a beam whose quality satisfies a predetermined threshold as the transmission beam of the BFR-request. In a possible implementation, the base station configures several candidate reference signals used for beam measurement, the terminal measures the quality of these reference signals, and selects a transmission beam corresponding to a reference signal satisfying a particular quality threshold requirement as the transmission beam of the BFR-request.

Optionally, the transmission beam of the RACH resource used for transmitting the BFR-request corresponds to a candidate beam carried by UE according to the RACH resource. Optionally, the transmission beam of the RACH resource used for transmitting the BFR-request may be indicated in advance by the base station by using signaling. Optionally, the transmission beam of the RACH resource used for transmitting the BFR-request may be a predefined default beam.

In addition, a reference signal indication in some embodiments of the present disclosure may correspond to a reference signal resource indication. For example, an SRS indication is implemented by using an SRS resource indication.

It should be understood that if a time-frequency resource of a PUCCH has a particular correspondence with a CORESET, it may be considered that the PUCCH is a PUCCH in the CORESET. For example, when the search space of one PUCCH corresponds to a CORESET or is configured in a CORESET, it may be considered that the PUCCH is a PUCCH in the CORESET.

Figure 3:
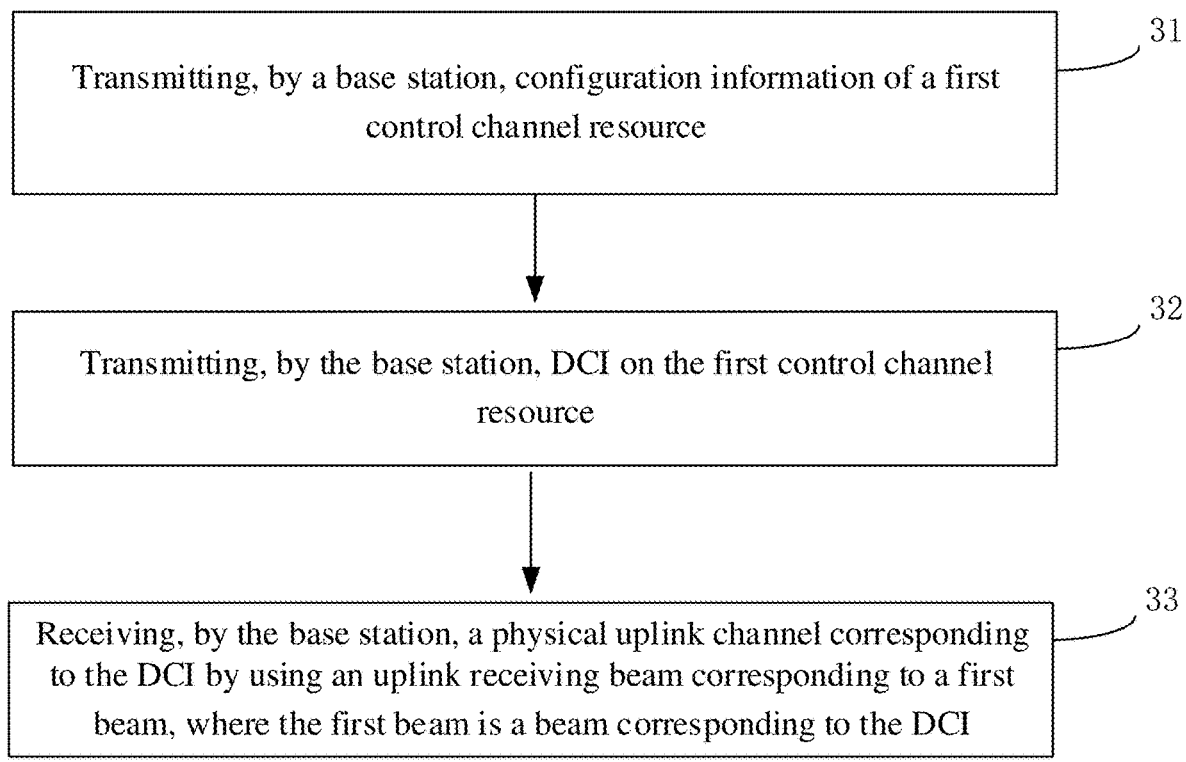
FIG. 3 is another schematic flowchart of a physical uplink channel transmission method according to some embodiments of the present disclosure.

The physical uplink channel transmission method in some embodiments of the present disclosure is described above from the perspective of a terminal side. A physical uplink channel receiving method in some embodiments of the present disclosure is further described below with reference to FIG. 3. As shown in FIG. 3, the method includes the following steps.

A step 31 includes: transmitting, by a base station, configuration information of a first control channel resource.

In the step, the first control channel resource may be a BFR-CORESET. In this case, the first control channel resource may include one CORESET or a group of CORESETs. In this case, the configuration information of the first control channel resource may include information such as an identifier of the CORESET, a resource size corresponding to the CORESET, precoding granularity, and QCL information of a PDCCH in the CORESET.

The first control channel resource may optionally be a search space used for BFR. In this case, the configuration information of the first control channel resource may include information such as a time-frequency resource position of the search space and the corresponding CORESET.

A step 32 includes: transmitting, by the base station, DCI on the first control channel resource.

In the step, when the DCI is a downlink scheduling grant, the physical uplink channel is a first PUCCH carrying a HARQ-ACK corresponding to a first PDSCH scheduled by the downlink scheduling grant. That is, the HARQ-ACK corresponding to the first PDSCH is transmitted in the first PUCCH. When the DCI is an uplink scheduling grant, the physical uplink channel is a first PUSCH scheduled by the uplink scheduling grant.

A step 33 includes: receiving, by the base station, a physical uplink channel corresponding to the DCI by using an uplink receiving beam corresponding to a first beam, where the first beam is a beam corresponding to the DCI.

In the step, the first beam may be a transmission beam for transmitting a BFR-request by a terminal; or the first beam is a transmission beam corresponding to a receiving beam for receiving the DCI by the terminal; or the first beam is an uplink transmission beam corresponding to a candidate transmission beam reported by the terminal while transmitting a BFR-request; or the first beam is a transmission beam indicated by the base station in advance by using signaling; or the first beam is a predefined default transmission beam.

The first beam does not have to be determined in the process of determining the uplink receiving beam in the step of receiving, by the base station, the physical uplink channel corresponding to the DCI by using the uplink receiving beam corresponding to the first beam. In an implementation of receiving, by the base station, the physical uplink channel corresponding to the DCI by using the uplink receiving beam corresponding to the first beam, the base station determines a signal corresponding to the first beam, and receives the physical uplink channel corresponding to the DCI by using an uplink receiving beam corresponding to the beam of the signal. For example, the terminal reports, to the base station, an SSB in spatial QCL with a physical uplink channel, the base station determines, according to the SSB, an uplink receiving beam corresponding to the SSB. The beam is the uplink receiving beam corresponding to the first beam.

Optionally, in the foregoing step 33, the base station may determine whether a signal indicated by first information is of a predetermined type, where the first information is signal indication information included in a configuration parameter that is transmitted to the terminal and is used for determining a transmission beam of the physical uplink channel. The base station may receive the physical uplink channel by using the uplink receiving beam corresponding to the first beam when the signal indicated by the first information is of the predetermined type; or the base station receives the physical uplink channel by using an uplink receiving beam corresponding to a second beam when the signal indicated by the first information is not of the predetermined type, where the second beam is a beam corresponding to the signal indicated by the first information.

The signal indicated by the first information includes, but is not limited to, one or any combination of a CSI-RS, an SRS, or an SSB. The predetermined type may be an SRS, a CSI-RS or an SSB.

By using the foregoing steps, in some embodiments of the present disclosure, the reliability of receiving a physical uplink channel by the base station can be improved.

The reception of a PUCCH is used as an example. After transmitting, to the terminal, the first PDSCH scheduled by the PDCCH in the BFR-CORESET, the base station may receive, by using the receiving beam corresponding to the transmission beam used by the terminal for transmitting the BFR-request, the first PUCCH carrying the HARQ-ACK corresponding to the first PDSCH.

Optionally, the base station may further receive a second PUCCH according to the receiving beam corresponding to the transmission beam indicated by the base station for the second PUCCH, where the second PUCCH is other PUCCH than the first PUCCH, or the second PUCCH is a PUCCH that is different from the first PUCCH and carries the HARQ-ACK corresponding to other PDSCH than the first PDSCH.

Optionally, in some embodiments of the present disclosure, a base station side may pre-store pairing information of uplink transmission and receiving beams, and the base station may obtain the receiving beam from the transmission beam according to the pairing information.

Optionally, if the parameter that is indicated by the base station by using signaling and is used for determining the transmission beam of the PUCCH includes information for determining that the indication information of a reference signal of the transmission beam of the PUCCH is the indication information of a reference signal of a specific type, the base station receives, by using the receiving beam corresponding to the transmission beam of the reference signal, the PUCCH carrying the HARQ-ACK corresponding to the PDSCH scheduled by the PDCCH in the BFR-CORESET. Otherwise, the base station receives, by using the receiving beam corresponding to the beam used by the UE for transmitting the BFR-request, the PUCCH carrying the HARQ-ACK corresponding to the PDSCH scheduled by the PDCCH in the BFR-CORESET.

Optionally, the reference signal of the specific type is an SRS, a CSI-RS or an SSB.

Optionally, if the parameter that is indicated by the base station by using signaling and is used for determining the transmission beam of the PUCCH corresponds to indication information of a CSI-RS, after transmitting the PDSCH scheduled by the PDCCH in the BFR-CORESET, the base station receives, by using the beam corresponding to the beam used by the UE for transmitting the BFR-request, the PUCCH carrying the HARQ-ACK corresponding to the PDSCH scheduled by the PDCCH in the BFR-CORESET. In an implementation, the base station may pre-store a beam pair for downlink transmission and uplink reception. The base station may determine, according to a downlink transmission beam of the CSI-RS, an uplink receiving beam corresponding to the downlink transmission beam.

Optionally, if the parameter that is indicated by the base station by using signaling and is used for determining the transmission beam of the PUCCH corresponds to indication information of an SSB, after transmitting the PDSCH scheduled by the PDCCH in the BFR-CORESET, the base station receives, by using the beam corresponding to the beam used by the UE for transmitting the BFR-request, the PUCCH carrying the HARQ-ACK corresponding to the PDSCH scheduled by the PDCCH in the BFR-CORESET.

Optionally, regardless of whether the base station uses signaling to indicate the parameter used for determining the transmission beam of the PUCCH or regardless of the information of the parameter that is indicated by the base station and is used for determining the transmission beam of the PUCCH, after transmitting the PDSCH scheduled by the PDCCH in the BFR-CORESET, the base station uses a beam corresponding to the beam used by the UE for transmitting the BFR-request to receive the PUCCH carrying the HARQ-ACK corresponding to the PDSCH scheduled by the PDCCH in the BFR-CORESET.

Based on the foregoing methods, the present disclosure further provides in some embodiments devices implementing the foregoing methods.

Figure 4:
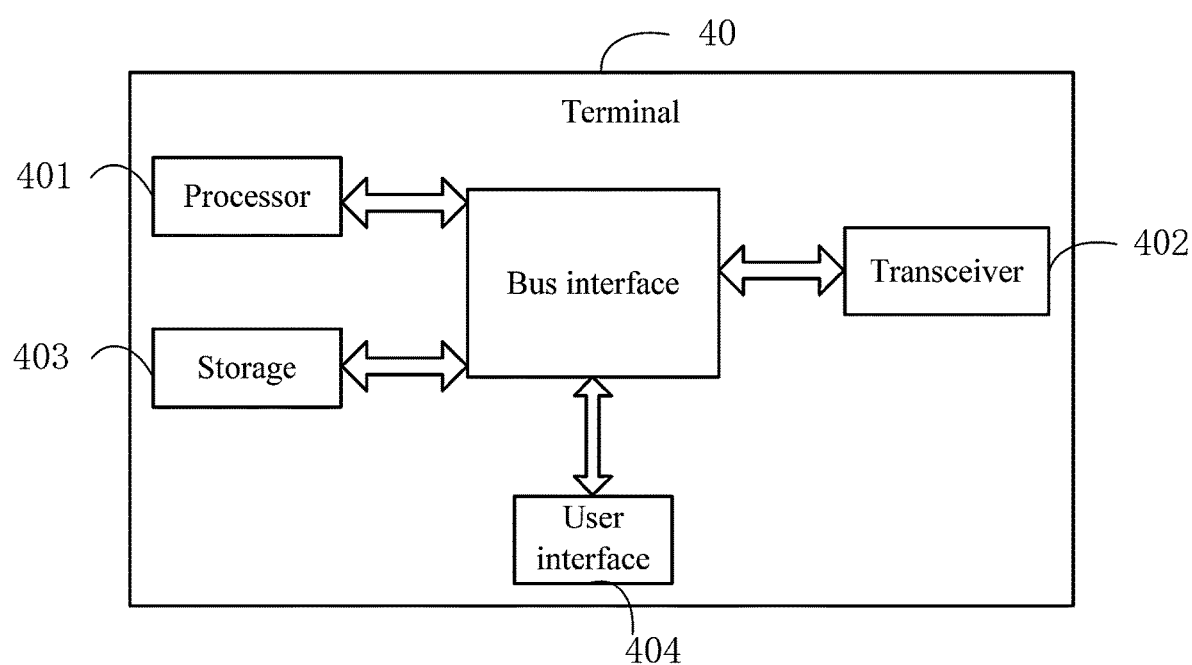
FIG. 4 is a schematic structural diagram of a terminal according to some embodiments of the present disclosure.

FIG. 4 is a schematic structural diagram of a terminal according to some embodiments of the present disclosure. The terminal 400 includes a processor 401, a transceiver 402, a storage 403, a user interface 404, and a bus interface.

In some embodiments of the present disclosure, the terminal 400 further includes a computer program stored in the storage 403 and configured to be executed by the processor 401.

The processor 401 is configured to read the program in the storage 403 to perform the following process: receiving configuration information of a first control channel resource by using the transceiver 402; receiving DCI according to the configuration information of the first control channel resource by using the transceiver 402; and transmitting a physical uplink channel corresponding to the DCI by using the transceiver 402 by using a first beam corresponding to the DCI.

In FIG. 4, a bus architecture may include any quantity of interconnected buses and bridges. Specifically, various circuits such as one or more processors represented by the processor 401 and a storage represented by the storage 403 are linked together. The bus architecture may also link various other circuits such as peripherals, voltage regulators, and power management circuits, which are well known in the art, and therefore are not further described herein. The bus interface provides an interface. The transceiver 402 may include a plurality of elements, that is, a transmitter and a receiver, to provide units for communicating with various other apparatuses over a transmission medium. For different user devices, the user interface 404 may be an interface capable of externally/internally connecting desired devices, including, but not limited to, a keypad, a display, a speaker, a microphone, a joystick and the like.

The processor 401 is responsible for managing the bus architecture and general processing. The storage 403 can store data used by the processor 401 while performing operations.

Optionally, the DCI is a downlink scheduling grant, and the physical uplink channel is a first PUCCH carrying a HARQ-ACK corresponding to a first PDSCH scheduled by the downlink scheduling grant.

Optionally, the DCI is an uplink scheduling grant, and the physical uplink channel is a first PUSCH scheduled by the uplink scheduling grant.

Optionally, the first control channel resource is a BFR-CORESET, or the first control channel resource is a search space used for BFR.

Optionally, the first beam is a transmission beam for transmitting a BFR-request by the terminal; or the first beam is a transmission beam corresponding to a receiving beam for receiving the DCI by the terminal; or the first beam is an uplink transmission beam corresponding to a candidate transmission beam reported by the terminal while transmitting a BFR-request; or the first beam is a transmission beam indicated by a base station in advance by using signaling; or the first beam is a predefined default transmission beam.

Optionally, the processor 401 is further configured to read the program in the storage 403, to perform the following process: determining whether a signal indicated by first information is of a predetermined type; and transmitting, when the signal indicated by the first information is of the predetermined type, the physical uplink channel by using the transceiver 402 by using the first beam, where the first information is signal indication information included in a configuration parameter that is received by the terminal and used for determining a transmission beam of the physical uplink channel.

Optionally, the processor 401 is further configured to read the program in the storage 403, to perform the following process: transmitting, when the signal indicated by the first information is not of the predetermined type, the physical uplink channel by using the transceiver 402 by using a second beam corresponding to the signal indicated by the first information.

Optionally, the signal indicated by the first information includes one or any combination of a CSI-RS, an SRS, or an SSB.

Optionally, the predetermined type is an SRS, a CSI-RS or an SSB.

Figure 5:
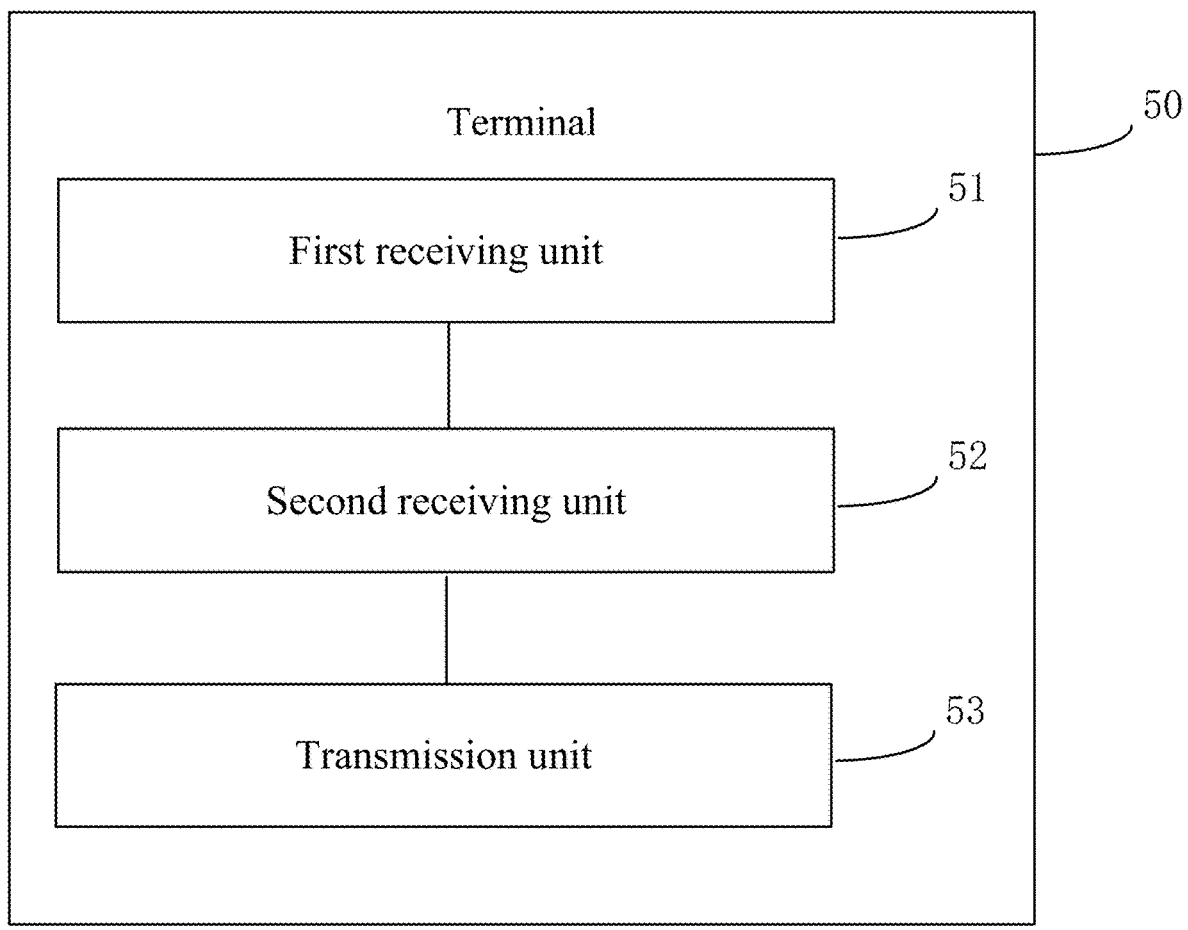
FIG. 5 is another schematic structural diagram of a terminal according to some embodiments of the present disclosure.

Referring to FIG. 5, the present disclosure provides in some embodiments another terminal 50, including:

a first receiving unit 51, configured to receive configuration information of a first control channel resource;

a second receiving unit 52, configured to receive DCI according to the configuration information of the first control channel resource; and a transmission unit 53, configured to transmit a physical uplink channel corresponding to the DCI by using a first beam corresponding to the DCI.

Optionally, the DCI is a downlink scheduling grant, and the physical uplink channel is a first PUCCH carrying a HARQ-ACK corresponding to a first PDSCH scheduled by the downlink scheduling grant.

Optionally, the DCI is an uplink scheduling grant, and the physical uplink channel is a first PUSCH scheduled by the uplink scheduling grant.

Optionally, the first control channel resource is a BFR-CORESET, or the first control channel resource is a search space used for BFR.

Optionally, the first beam is a transmission beam for transmitting a BFR-request by the terminal; or the first beam is a transmission beam corresponding to a receiving beam for receiving the DCI by the terminal; or the first beam is an uplink transmission beam corresponding to a candidate transmission beam reported by the terminal while transmitting a BFR-request; or the first beam is a transmission beam indicated by a base station in advance by using signaling; or the first beam is a predefined default transmission beam.

Optionally, the transmission unit 53 is further configured to: determine whether a signal indicated by first information is of a predetermined type; and transmit by the terminal, when the signal indicated by the first information is of the predetermined type, the physical uplink channel by using the first beam, where the first information is signal indication information included in a configuration parameter that is received by the terminal and used for determining a transmission beam of the physical uplink channel.

Optionally, the transmission unit 53 is further configured to transmit by the terminal, when the signal indicated by the first information is not of the predetermined type, the physical uplink channel by using a second beam corresponding to the signal indicated by the first information.

Optionally, the signal indicated by the first information includes one or any combination of a CSI-RS, an SRS, or an SSB.

Figure 6:
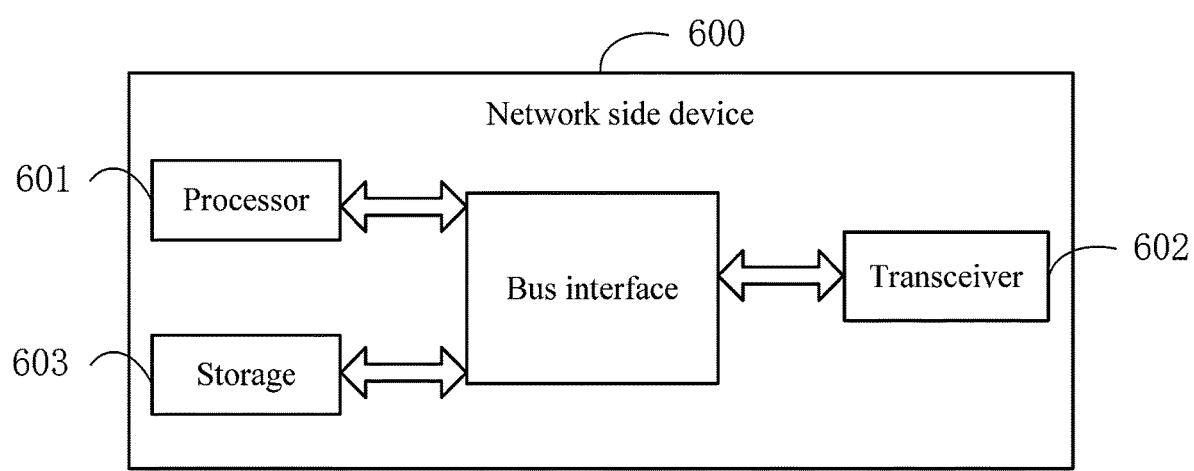
FIG. 6 is a schematic structural diagram of a base station according to some embodiments of the present disclosure.

FIG. 6 is a schematic structural diagram of a network side device 600 according to some embodiments of the present disclosure. The network side device 600 includes a processor 601, a transceiver 602, a storage 603, and a bus interface.

In some embodiments of the present disclosure, the network side device 600 further includes a computer program stored in the storage 603 and configured to be executed by the processor 601.

The processor 601 is configured to read the computer program stored in the storage 603 to perform the following process: transmitting configuration information of a first control channel resource by using the transceiver 602; transmitting DCI on the first control channel resource by using the transceiver 602; and receiving a physical uplink channel corresponding to the DCI by using the transceiver 602 by using an uplink receiving beam corresponding to a first beam, where the first beam is a beam corresponding to the DCI.

In FIG. 6, a bus architecture may include any quantity of interconnected buses and bridges. Specifically, various circuits such as one or more processors represented by the processor 601 and a storage represented by the storage 603 are linked together. The bus architecture may also link various other circuits such as peripherals, voltage regulators, and power management circuits, which are well known in the art, and therefore are not further described herein. The bus interface provides an interface. The transceiver 602 may include a plurality of elements, that is, a transmitter and a receiver, to provide units for communicating with various other apparatuses over a transmission medium.

The processor 601 is responsible for managing the bus architecture and general processing. The storage 603 can store data used by the processor 601 while performing operations.

Optionally, the DCI is a downlink scheduling grant, and the physical uplink channel is a first PUCCH carrying a HARQ-ACK corresponding to a first PDSCH scheduled by the downlink scheduling grant.

Optionally, the DCI is an uplink scheduling grant, and the physical uplink channel is a first PUSCH scheduled by the uplink scheduling grant.

Optionally, the first control channel resource is a BFR-CORESET, or the first control channel resource is a search space used for BFR.

Optionally, the first beam is a transmission beam for transmitting a BFR-request by a terminal; or the first beam is a transmission beam corresponding to a receiving beam for receiving the DCI by the terminal; or the first beam is an uplink transmission beam corresponding to a candidate transmission beam reported by the terminal while transmitting a BFR-request; or the first beam is a transmission beam indicated by a base station in advance by using signaling; or the first beam is a predefined default transmission beam.

Optionally, the processor 601 is configured to read the computer program stored in the storage 603 to perform the following process: determining whether a signal indicated by first information is of a predetermined type.

The processor 601 is further configured to read the computer program stored in the storage 603, to perform the following process: receiving, when the signal indicated by the first information is of the predetermined type, the physical uplink channel by using the transceiver 602 by using the uplink receiving beam corresponding to the first beam, where the first information is signal indication information included in a configuration parameter that is transmitted to the terminal and used for determining a transmission beam of the physical uplink channel; or receiving, when the signal indicated by the first information is not of the predetermined type, the physical uplink channel by using the transceiver 602 by using an uplink receiving beam corresponding to a second beam, where the second beam is a beam corresponding to the signal indicated by the first information.

Optionally, the signal indicated by the first information includes one or any combination of a CSI-RS, an SRS, or an SSB.

Optionally, the predetermined type is an SRS, a CSI-RS or an SSB.

Figure 7:
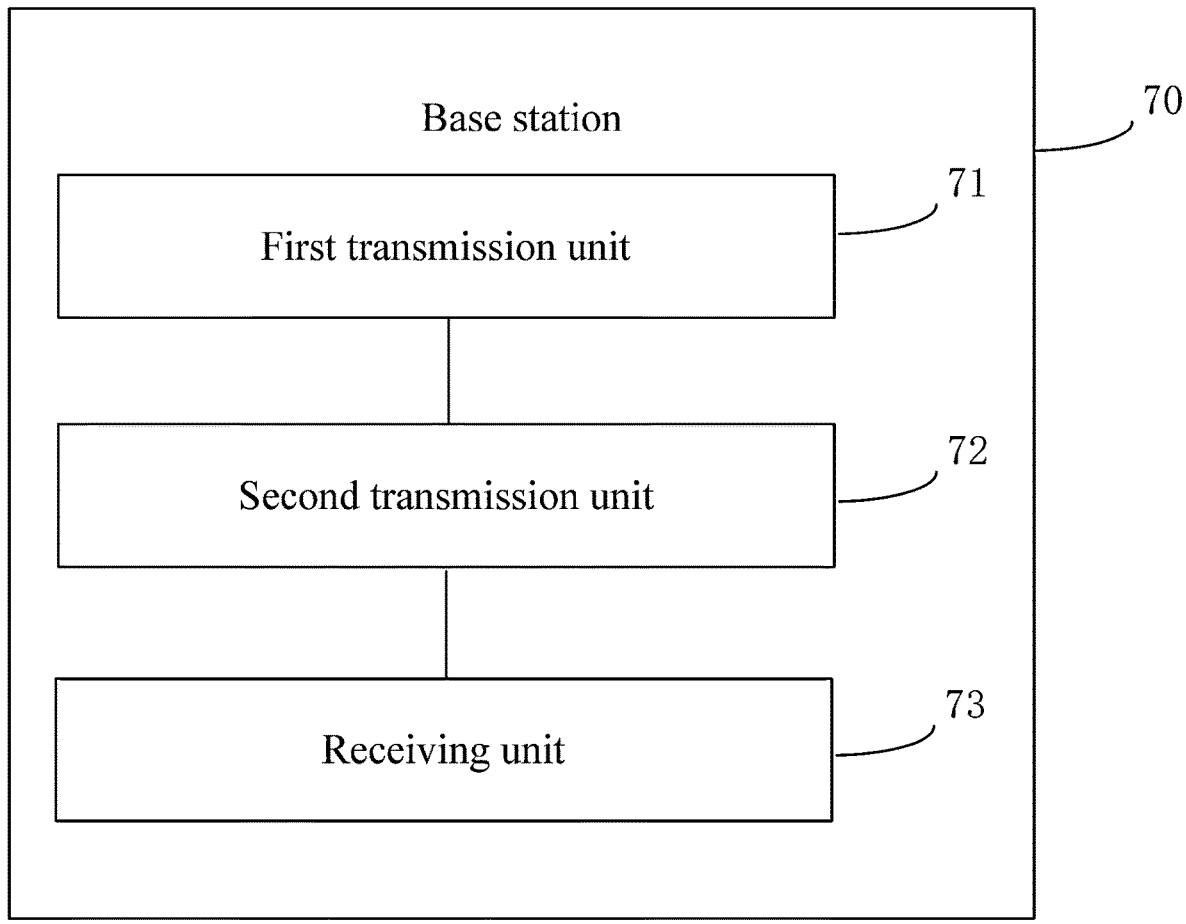
FIG. 7 is another schematic structural diagram of a base station according to some embodiments of the present disclosure.

Referring to FIG. 7, the present disclosure provides in some embodiments another structure of a base station 70. As shown in FIG. 7, the base station 70 includes:

a first transmission unit 71, configured to transmit configuration information of a first control channel resource;

a second transmission unit 72, configured to transmit DCI on the first control channel resource; and a receiving unit 73, configured to receive a physical uplink channel corresponding to the DCI by using an uplink receiving beam corresponding to a first beam, where the first beam is a beam corresponding to the DCI.

Optionally, the DCI is a downlink scheduling grant, and the physical uplink channel is a first PUCCH carrying a HARQ-ACK corresponding to a first PDSCH scheduled by the downlink scheduling grant.

Optionally, the DCI is an uplink scheduling grant, and the physical uplink channel is a first PUSCH scheduled by the uplink scheduling grant.

Optionally, the first control channel resource is a BFR-CORESET, or the first control channel resource is a search space used for BFR.

Optionally, the first beam is a transmission beam for transmitting a BFR-request by a terminal; or the first beam is a transmission beam corresponding to a receiving beam for receiving the DCI by the terminal; or the first beam is an uplink transmission beam corresponding to a candidate transmission beam reported by the terminal while transmitting a BFR-request; or the first beam is a transmission beam indicated by the base station in advance by using signaling; or the first beam is a predefined default transmission beam.

Optionally, the receiving unit 73 is configured to: determine whether a signal indicated by first information is of a predetermined type; and receive, when the signal indicated by the first information is of the predetermined type, the physical uplink channel by using the uplink receiving beam corresponding to the first beam, where the first information is signal indication information included in a configuration parameter that is transmitted to the terminal and used for determining a transmission beam of the physical uplink channel; or receive, when the signal indicated by the first information is not of the predetermined type, the physical uplink channel by using an uplink receiving beam corresponding to a second beam, where the second beam is a beam corresponding to the signal indicated by the first information.

Optionally, the signal indicated by the first information includes one or any combination of a CSI-RS, an SRS, or an SSB.

Optionally, the predetermined type is an SRS, a CSI-RS or an SSB.

The present disclosure further provides in some embodiments a computer-readable storage medium. The computer-readable storage medium includes a program and an instruction stored in the computer-readable storage medium. When the program and the instruction are executed by a processor of a computer, the processor implements the steps in the foregoing method described in FIG. 2 or FIG. 3. All the content described in FIG. 2 and FIG. 3 are also applicable to the example. For the purpose of simplification, related description is omitted herein.

The computer-readable storage medium mentioned in the present disclosure may be a volatile computer-readable storage medium or nonvolatile computer-readable storage medium.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that can store program code, such as a universal serial bus (USB) flash drive, a removable hard disk, a read-only memory (ROM), a random access memory (RAM), a magnetic disk, or an optical disc.

The aforementioned are merely specific implementations of the present disclosure, but the scope of the disclosure is by no means limited thereto. Any modifications or replacements that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. A physical uplink channel transmission method, comprising:
   receiving, by a terminal, configuration information of a first control channel resource;
   receiving, by the terminal, downlink control information (DCI) according to the configuration information of the first control channel resource; and
   transmitting, by the terminal, a physical uplink channel corresponding to the DCI by using a first beam corresponding to the DCI.

2. The physical uplink channel transmission method according to claim 1, wherein
   the DCI is a downlink scheduling grant, and the physical uplink channel is a first physical uplink control channel (PUCCH) carrying a hybrid automatic repeat request (HARQ)-acknowledgment (ACK) corresponding to a first physical downlink shared channel (PDSCH) scheduled by the downlink scheduling grant; or
   the DCI is an uplink scheduling grant, and the physical uplink channel is a first physical uplink shared channel (PUSCH) scheduled by the uplink scheduling grant.

3. The physical uplink channel transmission method according to claim 2, wherein the first control channel resource comprises at least one of a beam failure recovery (BFR)-control resource set (CORESET) or a search space used for BFR;
   and/or,
   wherein the first beam comprises at least one of:
      a transmission beam for transmitting a beam failure recovery (BFR)-request by the terminal,
      a transmission beam corresponding to a receiving beam for receiving the DCI by the terminal,
      an uplink transmission beam corresponding to a candidate transmission beam reported by the terminal while transmitting a BFR-request,
      a transmission beam indicated by a base station in advance by using signaling, or
      a predefined default transmission beam.

4. The physical uplink channel transmission method according to claim 1, wherein the transmitting, by the terminal, the physical uplink channel corresponding to the DCI by using the first beam corresponding to the DCI comprises:

determining whether a signal indicated by first information is of a predetermined type; and transmitting, by the terminal, the physical uplink channel by using the first beam when the signal indicated by the first information is of the predetermined type, wherein the first information is signal indication information comprised in a configuration parameter that is received by the terminal and used for determining a transmission beam of the physical uplink channel.

5. The physical uplink channel transmission method according to claim 4, wherein the transmitting, by the terminal, the physical uplink channel corresponding to the DCI by using the first beam corresponding to the DCI further comprises:

transmitting, by the terminal, the physical uplink channel by using a second beam corresponding to the signal indicated by the first information when the signal indicated by the first information is not of the predetermined type.

6. A physical uplink channel receiving method, comprising:

transmitting, by a base station, configuration information of a first control channel resource;

transmitting, by the base station, downlink control information (DCI) on the first control channel resource; and receiving, by the base station, a physical uplink channel corresponding to the DCI by using an uplink receiving beam corresponding to a first beam, wherein the first beam is a beam corresponding to the DCI.

7. The physical uplink channel receiving method according to claim 6, wherein the DCI is a downlink scheduling grant, and the physical uplink channel is a first physical uplink control channel (PUCCH) carrying a hybrid automatic repeat request (HARQ)-acknowledgment (ACK) corresponding to a first physical downlink shared channel (PDSCH) scheduled by the downlink scheduling grant; or the DCI is an uplink scheduling grant, and the physical uplink channel is a first physical uplink shared channel (PUSCH) scheduled by the uplink scheduling grant.

8. The physical uplink channel receiving method according to claim 7, wherein the first control channel resource comprises at least one of a beam failure recovery (BFR)-control resource set (CORESET), or a search space used for BFR;

and/or, wherein the first beam comprises at least on of:
  a transmission beam for transmitting a beam failure recovery (BFR)-request by a terminal,
  a transmission beam corresponding to a receiving beam for receiving the DCI by a terminal,
  an uplink transmission beam corresponding to a candidate transmission beam reported by a terminal while transmitting a BFR-request,
  a transmission beam indicated by the base station in advance by using signaling, or
  a predefined default transmission beam.

9. The physical uplink channel receiving method according to claim 6, wherein the receiving, by the base station, the physical uplink channel by using the uplink receiving beam corresponding to the first beam comprises:

determining whether a signal indicated by first information is of a predetermined type;

receiving, by the base station, the physical uplink channel by using the uplink receiving beam corresponding to the first beam when the signal indicated by the first information is of the predetermined type, wherein the first information is signal indication information comprised in a configuration parameter that is transmitted to the terminal and used for determining a transmission beam of the physical uplink channel.

10. The physical uplink channel receiving method according to claim 9, wherein the receiving, by the base station, the physical uplink channel by using the uplink receiving beam corresponding to the first beam further comprises:

receiving, by the base station, the physical uplink channel by using an uplink receiving beam corresponding to a second beam when the signal indicated by the first information is not of the predetermined type, wherein the second beam is a beam corresponding to the signal indicated by the first information.

11. A terminal, comprising:

a transceiver, a storage, a processor, and a computer program stored in the storage and configured to be executed by the processor, wherein the processor is configured to read the computer program stored in the storage to perform following steps:

receiving configuration information of a first control channel resource by using the transceiver; and receiving downlink control information (DCI) according to the configuration information of the first control channel resource by using the transceiver; and transmitting a physical uplink channel corresponding to the DCI by using the transceiver by using a first beam corresponding to the DCI.

12. The terminal according to claim 11, wherein the DCI is a downlink scheduling grant, and the physical uplink channel is a first physical uplink control channel (PUCCH) carrying a hybrid automatic repeat request (HARQ)-acknowledgment (ACK) corresponding to a first physical downlink shared channel (PDSCH) scheduled by the downlink scheduling grant; or the DCI is an uplink scheduling grant, and the physical uplink channel is a first physical uplink shared channel (PUSCH) scheduled by the uplink scheduling grant.

13. The terminal according to claim 12, wherein the first control channel resource comprises at least one of a beam failure recovery (BFR)-control resource set (CORESET), or a search space used for BFR;

and/or, wherein the first beam comprises at least one of:
  a transmission beam for transmitting a beam failure recovery (BFR)-request by the terminal,
  a transmission beam corresponding to a receiving beam for receiving the DCI by the terminal,
  an uplink transmission beam corresponding to a candidate transmission beam reported by the terminal while transmitting a BFR-request,
  a transmission beam indicated by a base station in advance by using signaling, or
  a predefined default transmission beam.

14. The terminal according to claim 11, wherein the processor is further configured to read the computer program stored in the storage to perform following steps:

determining whether a signal indicated by first information is of a predetermined type;

transmitting, when the signal indicated by the first information is of the predetermined type, the physical uplink channel by using the transceiver by using the first beam, wherein the first information is signal indication information comprised in a configuration parameter that is received by the terminal and used for determining a transmission beam of the physical uplink channel.

15. The terminal according to claim 14, wherein the processor is further configured to read the computer program stored in the storage to perform following steps:
    transmitting, when the signal indicated by the first information is not of the predetermined type, the physical uplink channel by using the transceiver by using a second beam corresponding to the signal indicated by the first information.

16. A base station, comprising:
    a transceiver, a storage, a processor, and a computer program stored in the storage and configured to be executed by the processor, wherein the processor is configured to read the computer program stored in the storage to perform steps of the physical uplink channel receiving method according to claim 6.

17. The base station according to claim 16, wherein
    the DCI is a downlink scheduling grant, and the physical uplink channel is a first physical uplink control channel (PUCCH) carrying a hybrid automatic repeat request (HARQ)-acknowledgment (ACK) corresponding to a first physical downlink shared channel (PDSCH) scheduled by the downlink scheduling grant; or
    the DCI is an uplink scheduling grant, and the physical uplink channel is a first physical uplink shared channel (PUSCH) scheduled by the uplink scheduling grant.

18. The base station according to claim 17, wherein the first control channel resource comprises at least one of a beam failure recovery (BFR)-control resource set (CORE-SET), or a search space used for BFR;
    and/or,
    wherein the first beam comprises at least one of:
        a transmission beam for transmitting a beam failure recovery (BFR)-request by a terminal,
        a transmission beam corresponding to a receiving beam for receiving the DCI by a terminal,
        an uplink transmission beam corresponding to a candidate transmission beam reported by a terminal while transmitting a BFR-request,
        a transmission beam indicated by the base station in advance by using signaling, or
        a predefined default transmission beam.

19. The base station according to claim 16, wherein the processor is further configured to read the computer program stored in the storage to perform following steps:
    determining whether a signal indicated by first information is of a predetermined type;
    receiving, when the signal indicated by the first information is of the predetermined type, the physical uplink channel by using the transceiver by using the uplink receiving beam corresponding to the first beam, wherein the first information is signal indication information comprised in a configuration parameter that is transmitted to the terminal and used for determining a transmission beam of the physical uplink channel.

20. The base station according to claim 19, wherein the processor is further configured to read the computer program stored in the storage to perform following steps:
    receiving, when the signal indicated by the first information is not of the predetermined type, the physical uplink channel by using the transceiver by using an uplink receiving beam corresponding to a second beam, wherein the second beam is a beam corresponding to the signal indicated by the first information.

* * * * *